(12) United States Patent
Barrett

(10) Patent No.: US 10,309,083 B2
(45) Date of Patent: Jun. 4, 2019

(54) FIRE HYDRANT POTABLE WATER CHLORINE NEUTRALIZING UNIT

(71) Applicant: Zachary Bradford Barrett, Garden Grove, CA (US)

(72) Inventor: Zachary Bradford Barrett, Garden Grove, CA (US)

( * ) Notice: Subject to any disclaimer, the term of this patent is extended or adjusted under 35 U.S.C. 154(b) by 0 days.

(21) Appl. No.: 14/680,347

(22) Filed: Apr. 7, 2015

(65) Prior Publication Data
US 2015/0307378 A1 Oct. 29, 2015

Related U.S. Application Data

(60) Provisional application No. 61/983,233, filed on Apr. 23, 2014.

(51) Int. Cl.
| | |
|---|---|
| *B01F 1/00* | (2006.01) |
| *C02F 1/68* | (2006.01) |
| *C02F 1/70* | (2006.01) |
| *E03B 9/02* | (2006.01) |

(52) U.S. Cl.
CPC .............. *E03B 9/02* (2013.01); *B01F 1/0033* (2013.01); *C02F 1/70* (2013.01); *C02F 1/688* (2013.01); *C02F 2303/185* (2013.01)

(58) Field of Classification Search
CPC .... E03B 9/02; C01F 1/70; C01F 1/688; C02F 2303/185; B01F 1/0016; B01F 1/0022; B01F 1/0027; B01F 1/0033
See application file for complete search history.

(56) References Cited

U.S. PATENT DOCUMENTS

| | | | |
|---|---|---|---|
| 5,152,464 A | 10/1992 | Farley | |
| 5,743,287 A * | 4/1998 | Rauchwerger | B01F 1/0027 137/268 |
| 6,102,444 A * | 8/2000 | Kozey | F16L 55/1155 285/376 |
| 6,117,316 A | 9/2000 | Burton | |
| 6,221,257 B1 | 4/2001 | Grim | |
| 6,227,463 B1 | 5/2001 | Porter | |
| 6,294,096 B1 | 9/2001 | Pate | |
| 6,464,885 B1 | 10/2002 | Smith | |
| 6,814,306 B1 | 11/2004 | Okubo | |
| 6,948,512 B2 | 9/2005 | McKeague | |
| 7,137,568 B1 * | 11/2006 | LaCrosse | B05B 1/267 239/1 |

(Continued)

OTHER PUBLICATIONS

"The Venturi Effect" from www.tech-faq.com/venturi-effect.html (obtained Apr. 2016).*
"The Venturi Effect" from www.tech-faq.com/venturi-effect.html, p. 1 (obtained Sep. 2016).*
Washington Suburban Sanitary Commission; Standard Specifications Section 02511 Chlorination and Dechlorination; System Extension Permit; Apr. 2009; 6 pgs.; wsscwater.com; USA.

(Continued)

*Primary Examiner* — Lucas A Stelling

(74) *Attorney, Agent, or Firm* — Kelly & Kelley, LLP

(57) ABSTRACT

A water discharge dechlorinator unit includes a body having a first end adapted to be removably coupled to a water hydrant, such as a fire hydrant. The body defines a water passageway between an inlet and an outlet thereof. A chamber is in fluid communication with the water passageway and configured for reception of dechlorinating material therein, such as chlorine neutralizing tablets, whereby water from the fire hydrant passes from the water passageway and over the dechlorinating material in the chamber so as to neutralize chlorine in the water before it is discharged from the unit.

18 Claims, 4 Drawing Sheets

(56) References Cited

U.S. PATENT DOCUMENTS

| | | |
|---|---|---|
| 7,150,827 B1 | 12/2006 | Grenning |
| 7,473,359 B1 | 1/2009 | Barrett, II |
| 7,497,228 B2 | 3/2009 | Taylor et al. |
| 2007/0138073 A1 | 1/2007 | Matthews |
| 2009/0255879 A1* | 10/2009 | Payeur .................. B01F 1/0027 |
| | | 210/754 |
| 2011/0094949 A1* | 4/2011 | Just ........................ C02F 1/688 |
| | | 210/85 |
| 2011/0278236 A1* | 11/2011 | Matthews ............... C02F 1/001 |
| | | 210/749 |

OTHER PUBLICATIONS

Romac Industries, Inc.; Take Aim at Simplifying Dechlorination; Jun. 29, 2009; 2 pgs., with 8-pg. Transmate deChlorinator Manual; romac.com; USA.

Pollardwater; LPD-250 and LPD-250A Dechlorinating Diffusers; Jun. 29, 2009; 4 pgs.; pollardwater.com; New York, USA.

Barrett, Zach; Z De-Chlorinator; 3 pgs.; California, USA.

Vita-D-Chlor LPD-250 Diffusing Dechlorinator; Integra Chemical; 1 pg.; vita-d-chlor.com; Washington, USA.

Vita-D-Chlor Bazooka; Integra Chemical; 1 pg.; vita-d-chlor.com; Washington, USA.

Vita-D-Chlor Dechlor Demon; Integra Chemical; 1 pg.; vita-d-chlor.com; Washington, USA.

Vita-D-Chlor deChlorinator; Integra Chemical; 1 pg.; vita-d-chlor.com; Washington, USA.

\* cited by examiner

FIRE HYDRANT POTABLE WATER CHLORINE NEUTRALIZING UNIT

RELATED APPLICATION

This application claims the benefit of U.S. Provisional Application No. 61/983,233, filed on Apr. 23, 2014.

BACKGROUND OF THE INVENTION

The present invention generally relates to public water systems. More particularly, the present invention relates to a dechlorinator unit for water which is discharged from fire hydrants and the like.

Chlorine is widely used as a disinfectant by water utilities and contractors. Chlorine is present in these waters as a result of disinfection of system components, such as water mains, storage facilities, etc. or disinfection of potable water.

Periodically, chlorinated waters from potable water systems are released to the environment. This may be due, for example, to planned releases of chlorinated waters as a result from operation and maintenance activities, such as disinfection of mains, testing of hydrants, and routine flushing of distribution systems for maintenance. Activities such as water main flushing in response to higher than allowable coliform counts, taste and odor complaints from the public are other examples of releases of chlorinated waters. Such discharged chlorinated water, such as from fire hydrants, are typically done into the storm drains which go to the ocean or lakes, rivers or ponds.

However, storm waters are usually discharged into receiving streams or waters leading to streams, and eventually into lakes and/or the ocean. Although chlorine protects humans from pathogens in water, it is highly toxic to aquatic species in the receiving streams, even in relatively low concentrations. In particular, chlorine may be toxic to many species protected under the Endangered Species Act.

The United States Environmental Protection Agency has established Water Quality Criteria for total residual chlorine concentrations or free residuals permissible in receiving waters, to protect aquatic life and water quality. These concentrations are based on acute and chronic toxicity effects for aquatic life. Most states in the United States have adopted a toxicity-based criterion for the water quality as well. The state regulatory agencies require water utilities to abide by the receiving water quality criterion while discharging chlorinated waters. The permit processes used by state regulatory agencies to regulate chlorinated water discharge vary significantly from state to state. For example, California, Oregon, Washington, Nevada, Maryland and West Virginia have stringent regulatory discharge limits for chlorinated waters, in that chlorine discharge limits in all water releases into receiving streams must not exceed 0.1 mg/L (or a more stringent limit in these states). Hence, preventing chlorinated water releases from reaching receiving streams and oceans is becoming an increasingly important issue for water utilities.

Dechlorination is practiced by some water utilities during releases of chlorinated water. However, many of the devices in use are complicated in that they have movable parts and/or attached hoses and can be complicated to use and expensive to purchase and operate.

Accordingly, there is a continuing need for a water hydrant potable water chlorine neutralizing unit which is simple in design and construction so as to be simple to use and inexpensive to manufacture and purchase. The present invention fulfills these needs, and provides other related advantages.

SUMMARY OF THE INVENTION

The present invention resides in a dechlorinator unit for dechlorinating water discharge from a water hydrant, such as a fire hydrant. The dechlorinator unit of the present invention is relatively small and simple in design, having no moving parts or hoses, so as to be simple to manufacture, easy to use, and relatively inexpensive.

The dechlorinator unit of the present invention comprises a body having a first end adapted to be removably coupled to a fire hydrant. The body defines a water passageway between an inlet and an outlet thereof. A chamber is in fluid communication with the water passageway and configured for reception of dechlorinating material therein. Water from the fire hydrant potable water passes from the water passageway and over the dechlorinating material in the chamber so as to neutralize chlorine in the water before it is discharged from the body.

More particularly, the body comprises a swivel having a first end adapted to be removably coupled to the fire hydrant. A coupling has a first end thereof attached to a second end of the swivel. A barrel is attached to a second end of the coupling. The barrel defines the water passageway between the inlet and outlet thereof.

The chamber extends from the barrel intermediate the inlet and outlet of the barrel in a direction generally non-parallel to the water passageway of the barrel. The chamber has a multi-diameter aperture in fluid communication with the water passageway of the barrel which defines the water inlet and outlet of the chamber. A first portion of the aperture adjacent the water passageway of the barrel or body is of a smaller diameter than a second portion of the aperture adjacent to the chamber, whereby a venturi fluid flow is created by the aperture. A chamber is configured for reception of dechlorinating material therein such that water is drawn into the chamber and passes over the dechlorinating material and returns to the water passageway of the barrel so as to neutralize chlorine in the water before it is discharged from the dechlorinator unit. A removable cap allows for manual insertion and removing of the dechlorinating material, such as one or more tablets comprised of chlorine neutralizing material.

A diffuser is disposed in the water passageway. For example, a diffuser plate may be associated with the swivel which can be removed for higher flows. Additionally, or alternatively, a diffuser may be in the water passageway before the chamber and a second diffuser in the water passageway after the chamber. A diffuser may be placed or formed at the outlet of the unit. A water discharge directing nozzle diverter may be rotatably attached to the body of the outlet thereof.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
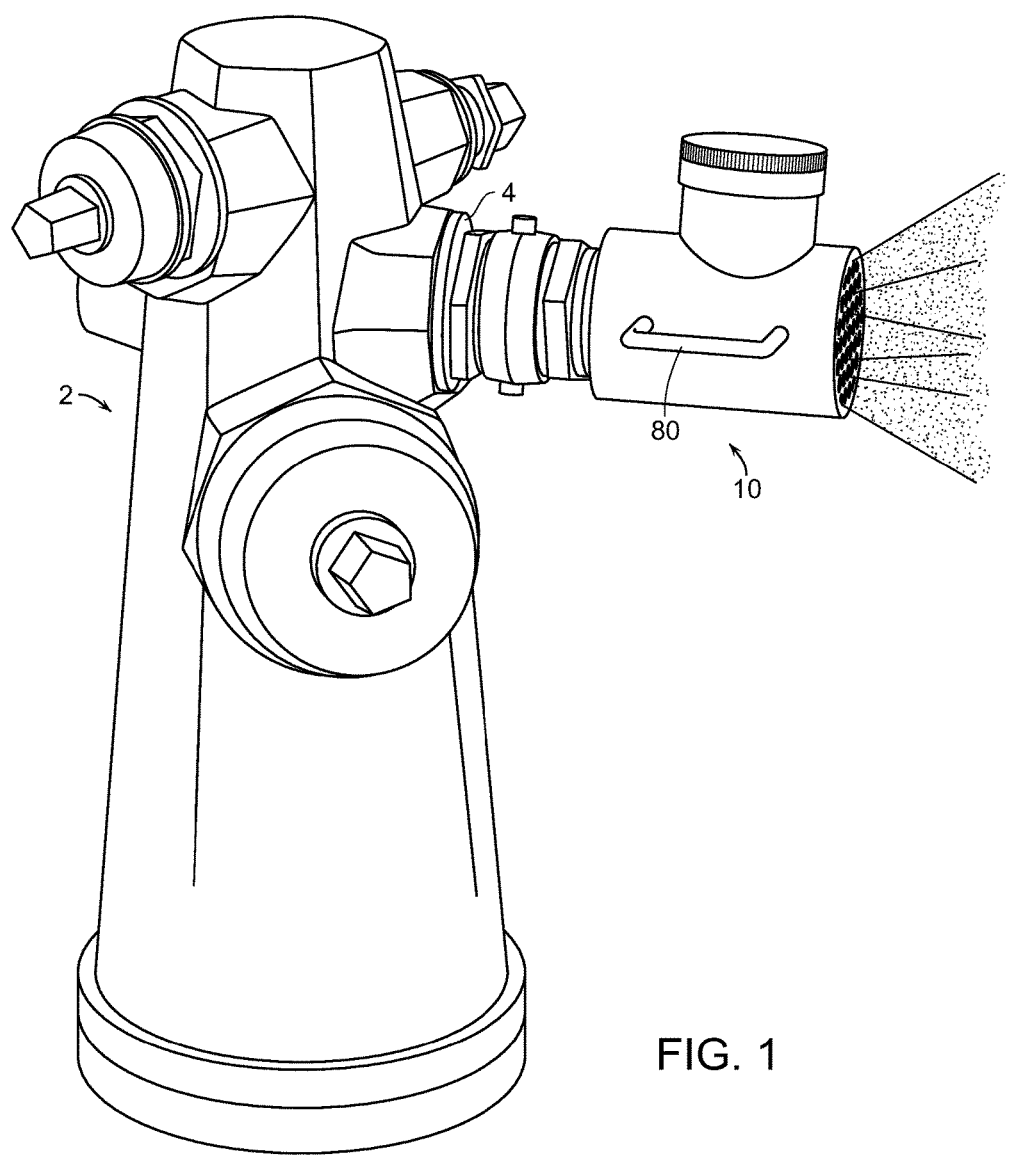
FIG. 1 is a perspective view of a dechlorinator unit attached to a fire hydrant, and discharging water therefrom, in accordance with the present invention.

As shown in the accompanying drawings, for purposes of illustration, the present invention resides in a dechlorinator unit for dechlorinating potable water from a water hydrant, such as a fire hydrant. With reference now to FIG. 1, a fire hydrant 2 is shown having a dechlorinator unit 10 of the present invention attached to an outlet 4 of the fire hydrant 2. Water passes through the water hydrant to and through the dechlorinator unit 10, where chlorine is neutralized before being expelled into the environment, such as into a street storm drainage system or the like.

Figure 2:
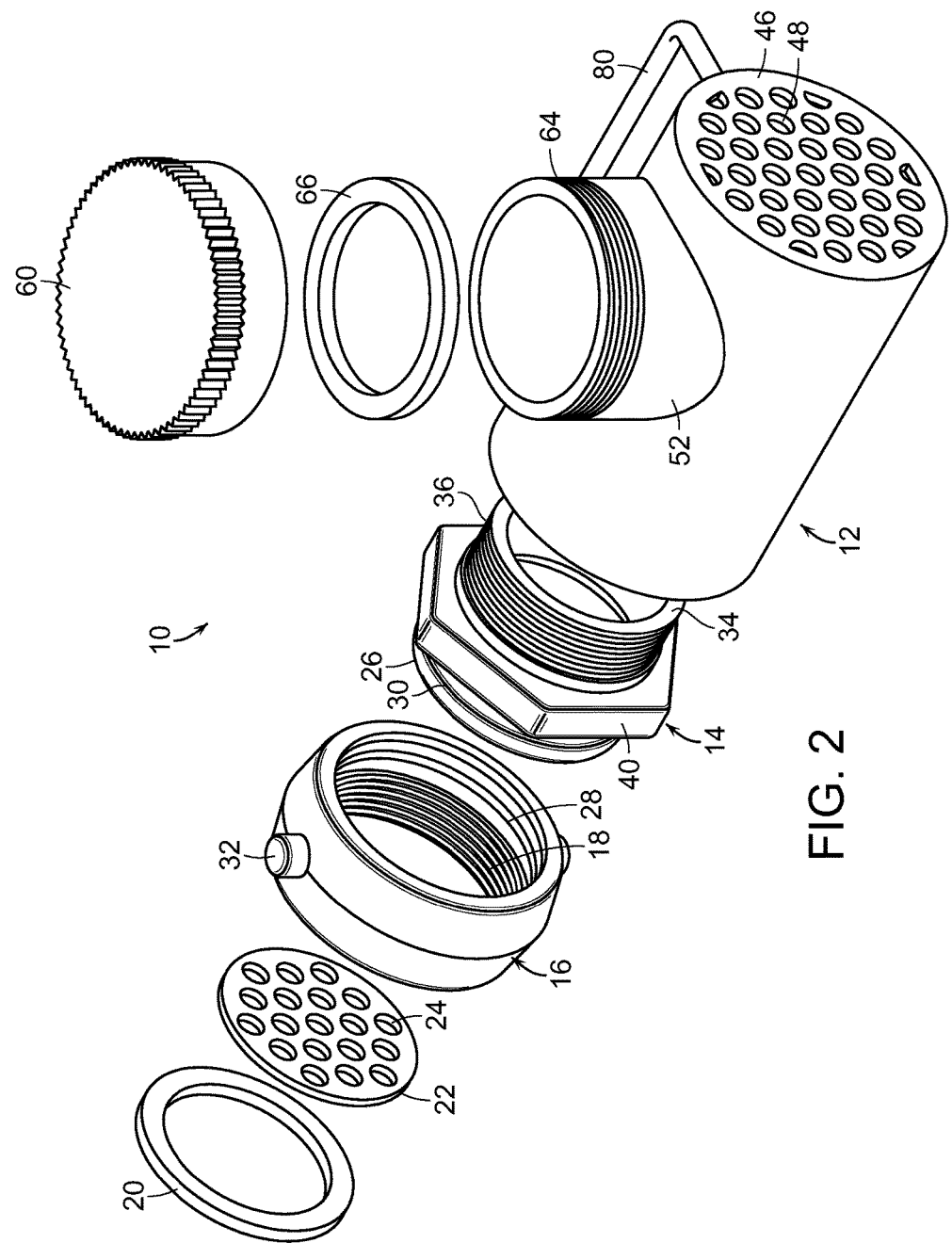
FIG. 2 is an exploded perspective view of the components comprising a dechlorinator unit embodying the present invention.

With reference now to FIG. 2, the unit 10 comprises a body having a first end adapted to be removably coupled to the fire hydrant 2 and a water passageway between an inlet thereof at the fire hydrant 2, and an outlet thereof. The body generally comprises a barrel 12 having a coupling or adapter 14 attached thereto and having a swivel 16 attached to the coupler 14, and configured for attachment to the fire hydrant 2.

Figure 3:
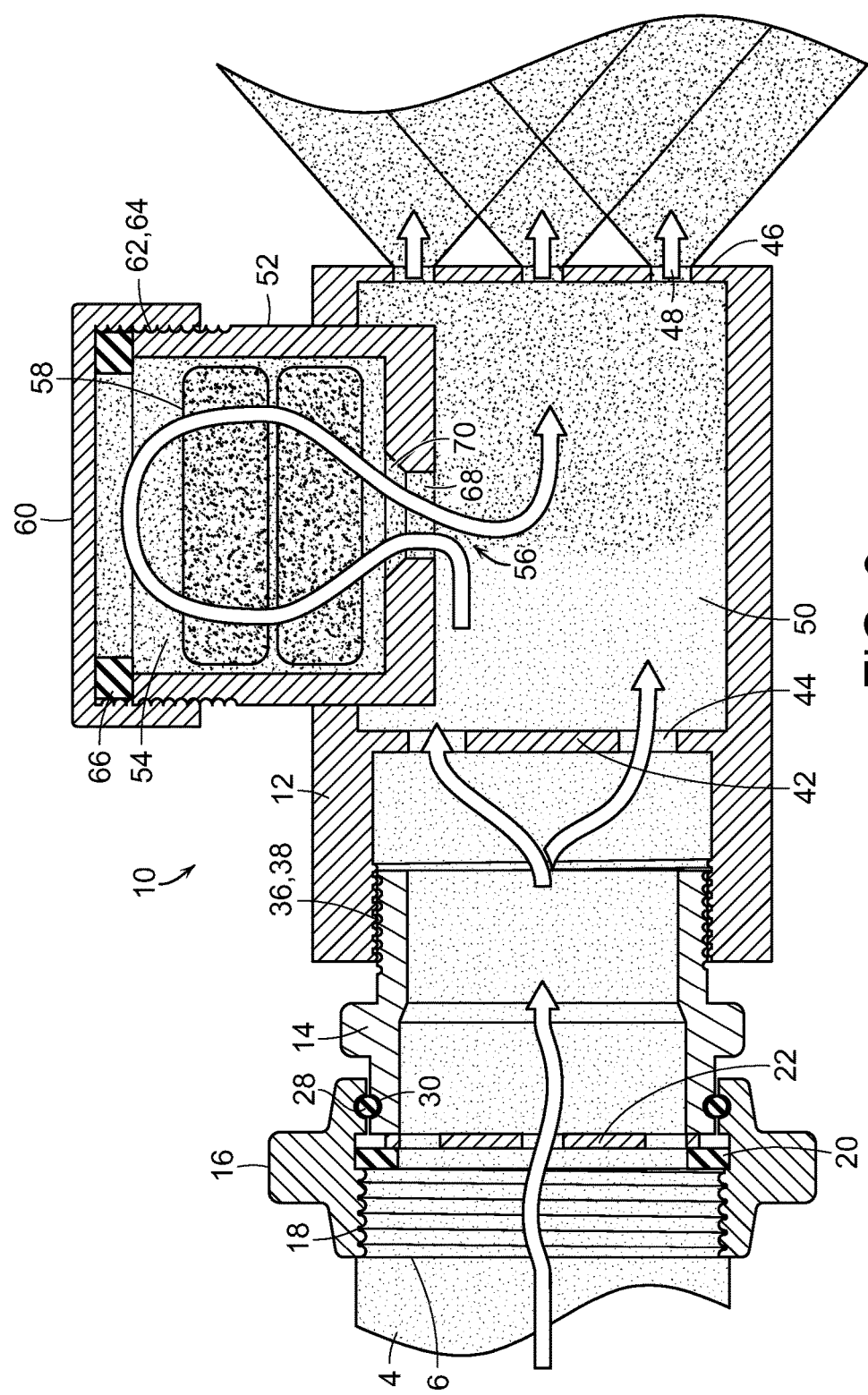
FIG. 3 is a cross-sectional diagrammatic view illustrating flow of the water from the hydrant through the dechlorinator unit, in accordance with the present invention.

More particularly, with reference to FIGS. 2 and 3, internal threads 18 of the swivel 16 are threadedly connected to external threads 6 of the outlet 4 of the fire hydrant 2. A gasket, such as the illustrated O-ring gasket 20, provides a leak-free connection between the swivel 16 and the water hydrant 2. Preferably, a diffuser 22, such as the illustrated plate having a plurality of apertures 24, resides within the swivel 16 or is disposed between the swivel 16 and the coupling 14 in order to control fluid pressure and flow through the unit 10. It will be appreciated that the diffuser 22 could also comprise a screen instead of the illustrated aperture plate.

The swivel 16 is attached to a first end 26 of the coupling 14 in such a manner so as to be rotatable with respect thereto. As such, the swivel 16 may include internal threads or grooves or protruding rings 28 which engage or mate with a corresponding thread, groove, or ring 30 of the first end 26 of the coupling 14. This may be done, for example, by snap-fit or press-fit connection or by merely threading the swivel 16 onto the first end 26 of the coupling 14. It will be understood that the swivel 16 may freely rotate with respect to the coupling 14 so as to be easily connected to the external threads 6 of the outlet 4 of the fire hydrant 2. The swivel 16 may include protrusions 32 which act as finger holds for facilitating the manual connection of the swivel 16 to the fire hydrant 2.

With continuing reference to FIGS. 2 and 3, the second end 34 of the coupling 14 is attached to the barrel 12, such as by means of the illustrated threaded connection whereby external threads 36 of the second end 34 of the coupling 14 are threadedly engaged with internal threads 38 of the barrel. The coupling 14 may include a multi-faceted, such as a hexagonal, protruding ring 40 which can facilitate the attachment of the coupling 14 to the barrel 12, either by hand or by means of a designed fire hydrant wrench or the like.

The coupling 14 may serve as an adapter, wherein the diameter of the second end 34 thereof is constant, so as to be attached to the barrel 12, yet the outer diameter of the second end 26 can vary so as to match the internal diameter of the swivel 16, which can vary in diameter to be connected to outlets of water hydrants which may vary in diameter and size. For example, the swivel 16 may be 1.25 inches, 2.5 inches or 4 inches in diameter so as to be attached to common outlets of water hydrants.

With reference now to FIG. 3, it can be seen that there is a water passageway between the inlet of the body or unit 10, where the swivel 16 is attached to the outlet 4 and to an outlet at the end of the unit. This water passageway may be generally horizontal and have a primary longitudinal axis along the length thereof, as illustrated in FIG. 3. In order to control fluid flow therethrough, the barrel 12 includes a wall 42 having a plurality of apertures 44 which acts as a diffuser. In the embodiment illustrated in FIGS. 2 and 3, an end wall 46 has a plurality of apertures 48 which also serves as a diffuser so as to break up the fluid flowing from out of the unit 10, causing it to spray instead of otherwise forming a high velocity fluid flow out of the unit 10 which could travel farther and potentially create damage.

A space 50 is formed between the diffusers formed by walls 42 and 46. A chamber 52 is in fluid communication with the space 50 of the barrel 12. The chamber 52 may extend into the barrel 12, as illustrated. The chamber 52 extends away from the barrel 12 at an angle which is non-parallel to the general flow of the water through the passageway of the barrel 12. As illustrated, the chamber 52 is comprised of a generally cylindrical member which is fixedly attached to and extends through the wall of the barrel 12 between the diffusers 42 and 46 at a normal angle to the water passageway. The chamber 52 protrudes through the side wall of the barrel 12, such that the bottom wall of the chamber 52 is fixedly suspended between the side wall and the center of the water passageway as shown in FIG. 3.

The chamber 52 defines an inner cavity 54 which is in fluid communication with the water in the barrel 12 by means of an aperture 56. Dechlorinating material 58, such as chlorine neutralizing tablets are manually disposed within the cavity 54 of the chamber 52. Such dechlorinating material 58 may be comprised of ascorbic acid or other known dechlorinating materials, such as sodium sulfates and derivatives thereof. An advantage of using ascorbic acid as the chlorine neutralizing tablet material is that it is relatively safe to the environment.

A cap 60 is selectively attached and removed from the chamber 52 in order to gain access to the inner cavity 54 and deposit or remove the dechlorinating material 58 therefrom. This may be, for example, by means of threaded connection wherein internal threads 62 of the cap 60 are threadedly engaged with exterior threads 64 of the chamber member 52. A seal or gasket, such as the illustrated O-ring 66 may be used to create a fluid-tight seal between the cap 60 and the chamber member 52.

As can be seen by the directional arrows in FIG. 3, the water passes from the hydrant 2 into the unit and through the diffusers 22 and 42 into the area 50 of the barrel 12. The water is then drawn up into the inner cavity 54 of the chamber 52 through aperture 56, wherein the water encounters the dechlorinating material 58 and the chlorine within the water is neutralized. Moreover, since the dechlorinating material 58 is typically dissolved in the presence of water, the dechlorinating material will become dissolved and exit through aperture 56 and into the water stream of the passageway to further treat the water, as illustrated by the darker dots in the illustration showing treated water.

One aspect of the invention is that the aperture 56, which provides the fluid communication between the barrel 12 and the chamber 52 is multi-diameter in configuration so as to create a venturi effect and draw water from inside the space 50 of the barrel 12 and into the inner cavity 54 of the chamber 52, and thus pass over and engage the dechlorinating material 58. More particularly, portion 68 of the aperture 56 which is immediately adjacent to the water passageway is of a first diameter, and area or portion 70 of the aperture 56 adjacent to the inner cavity 54 of the chamber 52 is of a second and greater diameter. This arrangement effectively draws water into the inner cavity 54 of the chamber 52, as described above. This is illustrated by the looping directional arrow through aperture 56.

Figure 4:
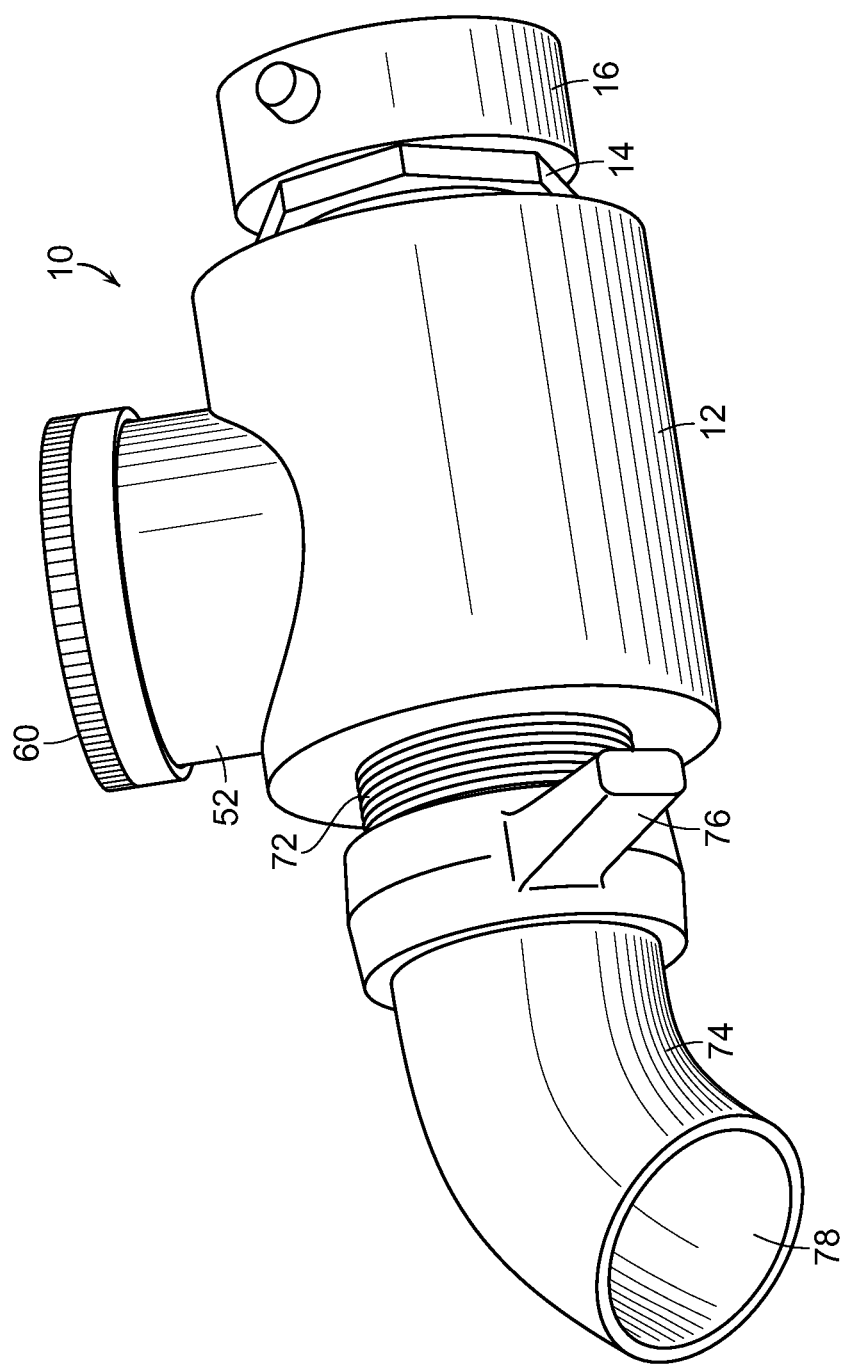
FIG. 4 is a side perspective view of a dechlorinator unit embodying the present invention and having a water discharge directing nozzle attached thereto.

With reference now to FIG. 4, instead of having an apertured wall at an end thereof, the barrel 12 may have a threaded end 72 to which is attachable a water discharge directing nozzle 74. In this manner, the water directing nozzle 74 can be oriented in the direction in which it is desired to have the water discharge from the unit 10, such as directly towards the ground surface adjacent to the water hydrant 2, instead of being directed generally horizontally away from the hydrant 2. The nozzle 74 may include a handle 76 for facilitating the attachment of the nozzle 74 to the barrel 12 and/or adjusting the direction of the outlet 78 of the nozzle 74.

With reference again to FIG. 2, the barrel 12 also preferably has a handle 80 extending therefrom which can be easily grasped in order to facilitate the attachment of the unit 10 to the water hydrant 2, such as by grasping handle 80 with one hand in order to keep the chamber 52 generally vertical, while attaching the swivel 16 to the outlet 4 of the fire hydrant 2 with the other hand.

Although several embodiments have been described in detail for purposes of illustration, various modifications may be made without departing from the scope and spirit of the invention. Accordingly, the invention is not to be limited, except as by the appended claims.

What is claimed is:

1. A fire hydrant water discharge dechlorinator unit, comprising:
    a body having a first end adapted to be removably coupled to a fire hydrant, the body defining a water passageway between an inlet and an outlet thereof; and
    a chamber fixedly attached to and fixedly extending through a side wall of the body and having a bottom surface fixedly suspended in the water passageway, the chamber defining an inner cavity configured for reception of dechlorinating material therein, the inner cavity being in fluid communication with the water passageway through only a single aperture in the bottom surface of the chamber, whereby water from the water passageway is drawn into the inner cavity, circulated over the dechlorinating material to create a homogeneous mixture of dechlorinating material and water, and returned to the water passageway through the single aperture in the bottom surface of the chamber with solute from the dechlorinating material so as to neutralize chlorine in the water before it is discharged from the body.

2. The dechlorinator unit of claim 1, wherein the chamber extends from the side wall of the body in a direction generally non-parallel to the water passageway.

3. The dechlorinator unit of claim 2, wherein the single aperture in the bottom surface of the chamber consists of a multi-diameter aperture defining a water inlet and outlet of the chamber.

4. The dechlorinator unit of claim 3, wherein a first portion of the multi-diameter aperture adjacent the water passageway of the body is of a smaller diameter than a second portion of the multi-diameter aperture adjacent to the inner cavity.

5. The dechlorinator unit of claim 1, wherein the body includes an internally threaded swivel attachable to the fire hydrant outlet.

6. The dechlorinator unit of claim 5, including a coupling attached to the swivel at one end thereof and to a barrel of the body at a generally opposite end thereof.

7. The dechlorinator unit of claim 5, including a diffuser plate associated with the swivel.

8. The dechlorinator unit of claim 1, including a first diffuser in the water passageway before the chamber and a second diffuser in the water passageway after the chamber.

9. The dechlorinator unit of claim 1, including a cap removably attached to the chamber for manually inserting and removing dechlorinating material within the inner cavity.

10. The dechlorinator unit of claim 9, wherein the dechlorinator material comprises at least one tablet comprised of chlorine neutralizing material.

11. The dechlorinator unit of claim 1, including a water discharge directing nozzle rotatably attached to the body at the outlet thereof.

12. A fire hydrant water discharge dechlorinator unit, comprising:
    a swivel having a first end adapted to be removably coupled to a fire hydrant;
    a coupling having a first end attached to a second end of the swivel;
    a barrel attached to a second end of the coupling, the barrel defining a water passageway between an inlet and outlet thereof;
    a chamber fixedly attached to and fixedly extending through a side wall of the barrel and partially extending into the barrel intermediate the inlet and outlet of the barrel in a direction generally non-parallel to the water passageway of the barrel, having a bottom surface fixedly suspended in the water passageway, the chamber defining an inner cavity configured for reception of dechlorinating material therein, the inner cavity being in fluid communication with the water passageway through a single water aperture in a bottom surface of the chamber, wherein the singe water aperture is multi-diameter, whereby water from the water passageway is drawn into the inner cavity, circulated over the dechlorinating material to create a homogeneous mixture of dechlorinating material and water, and returned to the water passageway of the barrel through the single water aperture so as to neutralize chlorine in the water before it is discharged from the dechlorinator unit; and
    a diffuser disposed between a fire hydrant connection and a discharge outlet of the dechlorinator unit.

13. The dechlorinator unit of claim 12, wherein a first portion of the single water aperture adjacent the water passageway of the barrel is of a smaller diameter than a second portion of the single water aperture adjacent to the inner cavity.

14. The dechlorinator unit of claim 12, wherein the diffuser comprises a diffuser plate associated with the swivel.

15. The dechlorinator unit of claim 12, wherein the diffuser comprises a first diffuser in the water passageway before the chamber and a second diffuser in the water passageway after the chamber.

16. The dechlorinator unit of claim 12, including a cap removably attached to the chamber for manually inserting and removing dechlorinating material within the inner cavity.

17. The dechlorinator unit of claim 16, wherein the dechlorinator material comprises at least one tablet comprised of chlorine neutralizing material.

18. The dechlorinator unit of claim 12, including a water discharge directing nozzle rotatably attached to the barrel at the outlet thereof.

* * * * *